United States Patent [19]

Flannery et al.

[11] 4,442,175

[45] Apr. 10, 1984

[54] CELLULAR CERAMIC BODIES AND METHOD MAKING SAME

[75] Inventors: James E. Flannery; Robert D. Shoup; Dale R. Wexell, all of Corning, N.Y.

[73] Assignee: Corning Glass Works, Corning, N.Y.

[21] Appl. No.: 461,670

[22] Filed: Jan. 27, 1983

[51] Int. Cl.³ ............................................. C03B 19/10
[52] U.S. Cl. .................................... 428/404; 65/21.3; 65/21.4; 65/22; 65/30.13; 65/30.14; 65/17; 428/406; 501/12; 501/33; 501/39; 501/84
[58] Field of Search ............... 428/404, 406; 65/21.2, 65/21.3, 21.4, 30.13, 30.14, 22; 501/12, 33, 39, 84

[56] References Cited

U.S. PATENT DOCUMENTS

| | | | |
|---|---|---|---|
| 2,883,347 | 4/1959 | Fisher et al. | 65/18.4 X |
| 2,978,339 | 4/1961 | Veatch et al. | 65/21.4 |
| 3,161,468 | 12/1964 | Walsh | 423/335 |
| 3,383,172 | 5/1968 | Biegler et al. | 423/335 |
| 3,790,360 | 2/1974 | Kato et al. | 65/30.13 X |
| 3,957,933 | 5/1976 | Egli et al. | 65/21.2 X |
| 4,101,301 | 7/1978 | Rigbi | 65/21.2 |
| 4,239,519 | 12/1980 | Beall et al. | 65/30.14 X |
| 4,336,338 | 6/1982 | Downs et al. | 65/22 |
| 4,349,456 | 9/1982 | Sowman | 501/12 X |
| 4,380,569 | 4/1983 | Shaw | 428/406 X |

*Primary Examiner*—Robert L. Lindsay, Jr.
*Attorney, Agent, or Firm*—C. S. Janes, Jr.

[57] ABSTRACT

Cellular ceramic bodies are produced by frothing a crystal-containing, ion-exchanged gel and setting the gel. An aqueous gel is prepared from a water-swelling mica and is blended in conjunction with a large cation donor, e.g., a potassium salt or silicate glass, and a surfactant to effect frothing of the gel by a shearing action and exchange of large cations with lithium and/or sodium ions from the mica to produce an ion-exchanged gel that sets in controllable manner.

32 Claims, No Drawings

CELLULAR CERAMIC BODIES AND METHOD MAKING SAME

BACKGROUND OF THE INVENTION

This invention relates to frothed gels containing synthetic mica crystals, to a procedure for effecting ion exchange in such gels, and especially to cellular ceramic bodies produced from such ion-exchanged gels. It is particularly concerned with the exchange of large cations (such as potassium ions) for sodium or lithium ions in a gel formed from a water-swelling mica (e.g., a lithium fluorhectorite gel) to produce such ion-exchanged gels. The resulting gels tend to set in a rapid, but controllable, manner.

U.S. Pat. No. 4,239,519 (Beall et al.) describes the formation of crystal-containing gels and the fabrication of papers, boards, fibers, films, and coatings from those gels. The process for preparing the gels contemplates three basic steps:

(1) a fully or predominantly crystalline body is formed (commonly a glass-ceramic body) containing crystals consisting essentially of a lithium and/or sodium water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite;

(2) the body is contacted with a polar liquid, normally water, to cause swelling and disintegration of the body accompanied with the formation of a gel; and (3) the solid:liquid ratio of the gel is adjusted to a desired level depending upon the product to be prepared therefrom.

To impart good chemical durability to papers, boards, fibers, films, and coatings derived from the gels, those bodies will be contacted with a source of large cations, frequently $K^+$ ions. This causes an ion exchange reaction to take place between the large cations and the $Li^+$ and/or $Na^+$ ions from the interlayer of the crystals.

U.S. Pat. No. 4,239,519 is primarily concerned with use of glass-ceramic type materials to produce crystal-containing gels. However, earlier work, as reported by the Bureau of Mines in Bulletin 647, Fluorine Micas, pages 236-242 (1969), involved sintering and recrystallizing a batch composed of raw materials such as talc, silica, magnesia, and fluorides to produce a water-swelling fluormica that was used in making paper.

PRIOR LITERATURE

In addition to literature already noted, U.S. Pat. No. 4,239,519 reviews the disclosures of several patents relative to synthetic fluormicas. That review is incorporated herein by reference to avoid repetition.

The exchange of ions in a variety of different glass-ceramics is also known. The exchange of potassium ions for lithium ions in beta-spodumene compositions, for example, is disclosed in U.S. Pat. No. 4,074,993 (Ackerman et al.). Such exchanges have generally been described as improving mechanical strength of a formed glass-ceramic body.

PURPOSE OF THE INVENTION

The basic purpose of the present invention is to provide cellular ceramic bodies produced from frothed, crystal-containing gels, particularly gels produced from synthetic, lithium and/or sodium, water-swelling micas.

A particular purpose is to provide an ion exchange procedure for chemically stabilizing a cellular body produced from such frothed gel.

A specific purpose is to provide an ion exchange procedure whereby the rate of exchange can be readily controlled and adjusted as necessary.

Another purpose is to provide a cellular, inorganic body of low density suitable for thermal insulating purposes.

A specific purpose is to provide a cellular body having a density below 15 lbs./ft.$^3$, and preferably below 6 lbs./ft.$^3$, to function as thermal insulation.

A further purpose is to provide a method of producing such body based on the materials and procedure disclosed in U.S. Pat. No. 4,239,519.

Another purpose is to employ frothing techniques and apparatus to produce a cellular ceramic body.

SUMMARY OF THE INVENTION

The method of preparing a cellular ceramic body in accordance with our invention comprises:

(a) forming an aqueous, crystal-containing gel from a synthetic, lithium and/or sodium, water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite, said gel containing about 2.5-25% by weight solids;

(b) subjecting the gel to a high shear blending action;

(c) adding a surfactant in an amount of about 0.1-2% by weight of said gel to cause bubble formation leading to the development of a froth as the gel is sheared;

(d) while blending, adding a source of an exchangeable large cation as an ion donor to cause an ion exchange reaction to take place between the large cations of said donor and the lithium and/or sodium ions of said lithium and/or sodium, water-swelling mica, thereby producing a frothed gel containing ion-exchanged, mica crystals;

(e) delivering said frothed, ion-exchanged gel from the blender to form a body of desired configuration;

(f) allowing the ion exchange to proceed to essential completion, thereby thickening and setting the gel to a solid body; and then, (g) drying said body.

Optionally, a thickening agent, in an amount up to about 2% by weight of the gel, may be added during the shear blending. This increases the viscosity of the frothed gel, and thereby resists coalescence and loss of air cells.

The large cation donor may be a soluble salt or glass powder. In the latter case, the glass powder is added in such amount that the dried body contains, in weight percent, 75-40% of the ion exchanged, water-swelling mica and 25-60% of the ion-exchanged glass powder.

Hydraulic cement glasses are disclosed in companion application Ser. No. 424030 filed Sept. 27, 1982 entitled "Hydraulic Cements Prepared from Glass Powders", and assigned to the assignee of the present application. These glasses have been found particularly useful for present purposes as well. They are composed essentially, in mole percent on an oxide basis, of 60-76% $SiO_2$, 15-30% $K_2O$, and may contain 2-15% of at least one metal oxide selected from 0–10% $Al_2O_3$, 0–5% $V_2O_5$, and 0–5% $TiO_2$, 0–5% $MoO_3$, and 0–5% $WO_3$.

The glasses may further contain up to about 5% $P_2O_5$ with the molar ratio of $K_2O:P_2O_5$ being in the range of 5 to 10. Further, the glasses may contain up to ten mole percent of one or more of the following: BaO, $B_2O_3$, $Bi_2O_3$, CaO, CdO, CoO, $Cr_2O_3$, $Cs_2O$, F, $Fe_2O_3$, $Li_2O$, MgO, $WO_3$, $MnO_2$, $MoO_3$, $Na_2O$, NiO, PbO, $Rb_2O$, SrO, ZnO, and $ZrO_2$.

The cellular ceramic body of the invention has a high mechanical strength and exhibits a density of less than 15 lbs./ft.$^3$. In a preferred form, it exhibits a density of 6 lbs./ft.$^3$ or less. It consists essentially of the ion exchange product of a large cation donor, for example, a potassium salt or potassium containing glass powder, and a synthetic, lithium and/or sodium, water-swelling mica wherein lithium and/or sodium ions on the mica surface are essentially replaced by larger ions, such as potassium ions, and the mica is selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite.

When the large cation donor is a glass, the cellular body exclusive of other additives, will contain 75–40% by weight of the ion-exchanged mica and 25–60% by weight of the ion-exchanged glass powder. Potassium silicate glasses are preferred, and may contain up to ten mole percent of various constituents in addition to the potassia and silica constituents. A particularly desirable additive, either in the glass or otherwise, is $P_2O_5$.

GENERAL DESCRIPTION OF THE INVENTION

The invention is based on our discovery that frothing or foaming of a gel containing synthetic, lithium and/or sodium, water-swelling mica crystals can be accomplished through a high shear blending action coupled with the addition of surfactants. The latter reduce the surface tension of the gel and give rise to bubble formation. The froth may be maintained, if necessary, through the inclusion of thickening agents, e.g., xanthan gum.

Prior ion exchange practice would suggest soaking the frothed gel, or products produced therefrom, in a solution of large cations, for example, an aqueous solution of KCl, to cause the desired large-ion-for-small-ion exchange reaction. This develops the green strength demanded for handling the foamed body and imparts chemical durability thereto. However, the time required for diffusion of K$^+$ ions through the foam matrix, to yield a body containing crystals consisting essentially of a potassium-ion-exchanged, lithium and/or sodium, water-swelling mica, is undesirably lengthy whereby cellular collapse tends to occur. Also, mechanical removal of the excess KCl solution becomes necessary.

The invention then is further based on our discovery that potassium salts and glasses, in powder form, can function as large cation donors. That is, they can release potassium ions (K$^+$), at a rapid, but controllable, rate when contacted with water or other polar liquid. More particularly, we discovered that, when these glasses or salts were added in powder form to an aqueous gel of a water-swelling mica, and blended therewith, potassium ions were released slowly enough to permit frothing of the gel by shear mixing, but sufficiently rapidly to promote setting of the froth prior to collapse of the cellular network. Consequently, by carefully controlling the composition and quantity of potassium-containing reactant (salt or glass powder) incorporated into the gel, it was possible to effect setting thereof almost instantly after frothing was completed, or within times up to about 20 minutes.

As can be appreciated, the rate of setting can be accelerated by gently heating the froth, either externally or by prolonging the blending. The heat inherently generated thereby increases the rate at which K$^+$ ions become solubilized from the salt or glass powder. The addition of fillers and/or reactive materials, such as inorganic beads or bubbles, and materials such as wollastonite, talc, magnesium oxide, vermiculite, and magnesium hydroxide, can yield frothed bodies of low density. Radiation opacifiers, such as zirconia and titania, may also serve as fillers thus performing a dual function.

The large cation donor may be any material containing the large cation in a releasable form for ion exchange. U.S. Pat. No. 4,239,519 discloses a wide range of large inorganic cations that may be employed. It has further been found that large organic cations may also be employed. A variety of such cations are described in companion application Ser. No. 461,672, filed Jan. 27, 1983 in the name of Shy-Hsien Wu and entitled "Organic-Inorganic Composites of Neutralized Polyelectrolyte Complexes".

As a general rule, it is preferred to employ a source of potassium ions, such as soluble potassium salts and glasses, both because of economics and because they appear to be most effective. Therefore, the invention is primarily described in terms of such preferred ion donor. However, it should be appreciated that, as taught in the indicated disclosures, a wide variety of other large cations may equally well be employed if their special properties are warranted.

For example, it is sometimes desirable to use an organic polycation, such as a quaternary ammonium acid salt as disclosed in the companion Wu application. These ions may be caused to cross link by subsequent thermal treatment, thereby improving resistance to moisture pickup. However, if used exclusively, they may contribute a sufficient organic component to lower the ultimate use temperature. Therefore, we may use a combination of inorganic and organic cation donors to counter this, while still obtaining at least some cross linking benefit.

An aqueous colloidal gel of a synthetic, water-swelling, lithium and/or sodium mica is the base material of the invention. This gel may be prepared by known procedures.

As described in detail in U.S. Pat. No. 4,239,519, a glass of suitable composition to produce the selected mica crystal phase is melted. The glass thus produced is then thermally treated to produce a glass-ceramic material. This is a predominantly crystallized material, in which the crystalline phase is the desired lithium and/or sodium, water-swelling mica. The disclosure of that patent is incorporated herein in total by reference.

The crystallized glass is now treated with a polar liquid, normally water, to cause swelling and disintegration of the glass-ceramic into minute particles that disperse in the liquid to form the gel. The crystalline body contains crystals consisting essentially of a lithium and/or sodium, water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite.

Alternatively, a synthetic, lithium and/or sodium mica, gel-forming material e.g., a lithium fluorhectorite, may be produced by sintering a batch composed of suitable raw materials. For example, a batch may be produced from talc, a silica source such as silicic acid or powdered silica, lithium silicate, magnesia, lithia and fluorides of lithium, magnesium, or ammonium. The batch, well homogenized, may be reacted at about 900° C. for 1 to 4 hours to produce a sintered and recrystallized material that contains a lithium fluorhectorite crystal phase. The material produces a gel when it swells and disintegrates in water or other polar liquid. Fusion cast glasses may also be employed if desired.

For purposes of the present invention, a colloidal gel, preferably in water, is formed using either glass-ceramic, fusion cast, or sintered material, as described above. This colloidal gel is adjusted to contain 2.5-25% by weight solids. It is introduced into a high shear mixer and the mixer activated.

A minor amount (up to about 2%) of a surfactant is added to lower the surface tension of the gel. This promotes frothing and bubble formation during the high shear blending action. If necessary, the frothed mass may later be maintained by addition of up to 2% of a thickening agent, such as xanthan gum or polyethylene oxide thickeners. This raises the viscosity of the blended mass and thereby inhibits coalescence of the air cells.

Once a bubbly froth develops, an amount of glass powder or salt containing an exchangeable potassium ion, or other large cation, is added. This is preferably a potassium silicate glass or potassium salt containing potassium ions that are readily exchangeable with lithium or sodium ions from the fluormica crystals in the frothed gel. Preferably, a glass is rendered sufficiently fine to pass a No. 100 United States Standard sieve.

Subsequent to adding the potassium ion donor, blending is continued to thoroughly intermingle the additive and the gel containing the crystalline material. This permits maximum ion exchange between the two, that is exchange of potassium ions from the glass or salt for lithium or sodium ions from the crystalline material to form an ion exchanged mica.

In the event a thickener is required, it may be added at this point. Whether it is needed will depend in large measure on how fast the ion exchange occurs and whether a continuous process is employed. If the ion exchange is very rapid, the gel tends to quickly become sufficiently viscous to avoid cell loss without a thickener. Likewise, where a continuous frothing apparatus is employed, the materials are sufficiently enclosed so that the danger of cell loss is minimized.

Upon completion of the ion exchange, the frothing may be discontinued and the frothed mass poured into molds, or other desired formers, and allowed to set. In a continuous frothing apparatus, the mixture may be pumped under pressure through a high shear head, or otherwise continuously delivered, to forming means.

It will be understood that the time required to set a foam may range from virtually instantaneous to in excess of 24 hours, depending upon composition and the end use foreseen for the product. A corollary to that proposition reads that the time required for setting the froth can be rather strictly regulated through choice and quantity of the ion donor employed, its solubility, and the temperature of the mixture. The cementing property of the hydraulic cement glass powders greatly enhances the mechanical strength of the cellular products produced therefrom.

Where a glass powder is used as the cation donor, the relationship of ion-exchanged mica and ion-exchanged glass in the final cellular ceramic body (exclusive of other additives) will be 40-75% mica and the remainder (60-25%) glass. In addition to these two components, any filler or extender, such as inorganic beads or bubbles, wollastonite, talc, magnesium oxide, vermiculite, magnesium hydroxide, and the radiation opacifiers may be included up to about 80% by weight. Their use is limited only by body integrity and desired body strength for the intended application.

The composition and concentration of the ion exchange glass or salt employed may be controlled and/or adjusted so that the frothed material will set in times ranging up to twenty minutes. The setting time may also be accelerated by heating the froth, either from an external source or by prolonging the blending action (internal). Such heating also increases the rate of the ion exchange process.

Composition factors relative to the potassium silicate, hydraulic cement glasses are generally discussed in the composition application Ser. No. 424,030, mentioned earlier. The disclosures in that application are incorporated in total by reference.

For present purposes, an important consideration is exchangeability of an ion, such as the potassium ion, for lithium or sodium in the water-swelling mica. In general, the rate of exchange increases with potassium ion concentration. This may be controlled by the $K_2O:SiO_2$ ratio in a glass, or by the glass or salt concentration added to the gel, or solubility of the salt or glass. In general, we prefer to add 2 to 10% by weight glass based on weight of gel with a concentration of about 5% being generally preferred. It is usually desirable to provide excess exchange ion donor to permit as complete an exchange as possible of the exchangeable lithium and/or sodium ions on the mica platelets. In the case of the preferred potassium ion exchange, the potential potassium ion content in the ion-exchanged mica (analyzed as $K_2O$) should be at least 5% and may be as high as 15%.

The presence of additives may stabilize a cement glass, and may also promote its setting. However, we find they may inhibit the potassium ion exchange and must be used with care.

We find that presence of the phosphate ion, in moderate amounts, tends to promote the setting rate of the foam, and to contribute to stability against moisture pickup. The phosphate ion may be added as part of a glass additive, or may be added independently. In any case, it should not exceed about 10% and preferably not more than 5% in the final cellular body.

The function of the phosphate ion is not known, but one possible explanation is that it reacts with, and ties up chemically, lithium ions released in the ion exchange. This is supported by the fact that lithium phosphate is quite insoluble in water.

Depending on the ultimate use of the cellular body, a density of less than 3 lbs./ft.$^3$ up to about 15 lbs./ft.$^3$ may be obtained. In general, higher density bodies have greater mechanical strength, whereas lower density bodies are preferred for thermal insulation. Thus, the thermal conductivity (the K-value) of a material usually decreases with density, other factors being equal.

Extremely low densities on the order of 2-3 lbs./ft.$^3$ may be obtained by incorporating an organic, or other removable or evanescent, material in the foamed material. One such material is styrene beads which may subsequently be burned out by firing the body at an elevated temperature.

DESCRIPTION OF PREFERRED EMBODIMENTS

Table I records compositions, expressed in terms of mole percent on the oxide basis, of glasses which, in powder form, will provide ion exchange glasses for use in the instant invention. Table IA reports the same compositions as recalculated in terms of parts by weight on the oxide basis. The sum of the tabulated values totals or very closely approximates 100. For all practical purposes then, Table IA may be deemed to reflect weight percent. The actual batch ingredients employed may be any materials, whether the oxide or other compound, which, when melted together, will be converted into the desired oxide in the proper proportions.

TABLE I

| Mole % | 1 | 2 | 3 | 4 | 5 | 6 | 7 | 8 |
|---|---|---|---|---|---|---|---|---|
| $SiO_2$ | 72.3 | 71.0 | 70.0 | 65.0 | 73.0 | 75.0 | 73.0 | 70.0 |
| $K_2O$ | 22.8 | 22.0 | 22.8 | 28.5 | 20.0 | 25.0 | 25.0 | 25.0 |
| $P_2O_5$ | 2.4 | 2.4 | 4.1 | 3.0 | 5.0 | — | — | — |
| $Al_2O_3$ | 2.5 | 2.0 | 3.5 | 3.5 | 2.0 | — | — | — |
| $MoO_3$ | — | — | — | — | — | — | 2.0 | — |
| $B_2O_3$ | — | 2.6 | — | — | — | — | — | — |
| SrO | — | — | — | — | — | — | — | 5 |

TABLE IA

| Wt. % | 1 | 2 | 3 | 4 | 5 | 6 | 7 | 8 |
|---|---|---|---|---|---|---|---|---|
| $SiO_2$ | 61.3 | 60.4 | 57.6 | 53.0 | 61.0 | 65.7 | 62.5 | 59.5 |
| $K_2O$ | 30.3 | 29.3 | 29.5 | 36.4 | 26.3 | 34.3 | 33.4 | 33.2 |
| $P_2O_5$ | 4.8 | 4.8 | 8.0 | 5.8 | 9.9 | — | — | — |
| $Al_2O_3$ | 3.6 | 2.9 | 4.9 | 4.8 | 2.8 | — | — | — |
| $MoO_3$ | — | — | — | — | — | — | 4.1 | — |
| $B_2O_3$ | — | 2.6 | — | — | — | — | — | — |
| SrO | — | — | — | — | — | — | — | 7.3 |

A glass batch corresponding to each Example was compounded and ballmilled to secure thorough mixing and to aid in obtaining a homogeneous melt. The mixtures were deposited into platinum or silica crucibles, and the crucibles introduced into an electrically-fired furnace operating at about 1550° C. Glass batches containing transition metal oxides were usually melted in silica crucibles to prevent attack thereby of a platinum crucible. After melting for 4-16 hours, the molten glasses were poured onto water-cooled rollers to form ribbon having a thickness of about 1/16"-⅛". The ribbon was subsequently comminuted, utilizing conventional ballmilling apparatus, to pass a No. 200 United States Standard Sieve.

An aqueous lithium fluorhectorite gel was orepared containing 8% solids, the solids being provided by a glass-ceramic having the calculated approximate composition in weight percent on the oxide basis of: 64.5% $SiO_2$, 10.8% MgO, 8.0% $Li_2O$, and 16.7% $MgF_2$. Several two hundred c.c. samples of this gel were prepared.

Each sample was placed in a high shear mixer and the mixer activated. To each sample were added ten (10) grams of a glass corresponding to one of the compositions set forth in TABLE I. Prior to such glass addition two (2) grams of a surfactant, specifically, a material available from Rohm and Haas Company, Philadelphia, Pennsylvania, under the designation Triton X-100, were added to the lithium fluorhectorite gel to aid in developing a froth during mixing. The blending action, after addition of the potassium silicate glass, was continued until the foam became warm, usually ten to twenty minutes.

Once the mix was fully frothed, 1.5 grams of a thickener, such as xanthan gum, were added to maintain the foam.

The foams thus produced were poured into molds and allowed to set overnight. Following that, each set body was dried with mild heating at a temperature not over about 50° C.

TABLE II presents, for each glass composition, properties measured or observed on the cellular body prepared utilizing the corresponding glass.

TABLE II

|  | 1 | 2 | 3 | 4 | 5 | 6 | 7 | 8 |
|---|---|---|---|---|---|---|---|---|
| Setup Rate |  |  |  |  |  |  |  |  |
| R.T | M. | V.S. | F. | V.F. | S. | V.F. | F. | S. |
| Cold (~34° F.) | S. | — | M. | F. | — | F. | M. | — |
| Density (lbs/ft$^3$) | 4.5 | — | 4.6 | 4.5 | 5.3 | 3.7 | 4.2 | 6.0 |
| Cell Structure | F.C. | — | F.C. | F.C. | C.C. | F.C. | F.C. | C.C. |

M = moderately fast
S = slow
F = fast
V.F. = very fast
V.S. = very slow
F.C. = fine cell
C.C. = coarse cell The setup rate is shown at room temperature (R.T.) and at a cold temperature (34° F.). Setup rate is a function of potassium ion (K+) dissolution from the glass and, in turn, its exchange for lithium ion (Li+) from the hectorite particles in the gel. The rate depends on the $K_2O$ content in the glass and indirectly on the alumina content. Glass composition 2, and the solution prepared therewith, has the slowest rate and, with a ten gram addition per 200 c.c. of 10% solids fluorhectorite gel, is too slow to be useful. To be used then, a greater amount or concentration of glass must be added.

Density is given in lbs./ft.$^3$. Cell structure is given in terms of fine cell (F.C.) and coarse cell (C.C.). Generally speaking, the mix that exchanges most rapidly provides the finest cells and lowest densities. If the exchange rate is too rapid so that the gel sets up in the blender, the glass concentration may be cut back or the blending chilled as indicated by the 34° F. values.

Further tests have shown that the presence of $H_3PO_4$ in the frothed gel tends to increase the setup rate. Also, there are indications that the presence of $P_2O_5$ in the ion exchanged product may increase resistance to water pickup. Hence, additive glasses having a $P_2O_5$ content may be preferred.

Several batches were prepared having a sintered composition similar to that given above for the lithium fluorhectorite glass-ceramic used in gel preparation. These batches were prepared from talc, silica, magnesia, lithium hydroxide and hydrated magnesium silicofluoride and well mixed. Each batch was heated at 900° C. for one to four hours to recrystallize the batch to a fluorhectorite composition. Each recrystallized batch was placed in water where it became swollen and disintegrated to produce a dispersion containing about 10% solids. These were then foamed in the manner described earlier employing the potassium silicate glass of Example 1 as the ion exchange glass added to the gel during blending.

TABLE III below lists the sintered compositions that were prepared in molecular formula, the sintering schedule, the cell structure and the density of each foamed product.

TABLE III

| Gel Composition | Sinter Time | Cell Structures | Foam Density |
|---|---|---|---|
| 9. $Li_{.7}Mg_{2.3}Li_{.7}Si_4O_{10}F_2$ | 4 hr - 900° C. | Fine | 6.0 lb/ft.$^3$ |
| 10. $LiMg_{2.0}LiSi_4O_{10}F_2$ | 4 hr - 900° C. | Fine | 5.1 lb/ft.$^3$ |
| 11. (0.5 LiF) $(LiMg_2LiSi_4O_{10}F_2)$ | 1 hr - 900° C. | Coarse | 4.4 lb/ft.$^3$ |
|  | 4 hr - 900° C. | Fine | 5.5 lb/ft.$^3$ |
| 12. (LiF) $(LiMg_2LiSi_4O_{10}F_2)$ | 1 hr - 900° C. | Coarse | 6.2 lb/ft.$^3$ |
|  | 4 hr - 900° C. | Fine | 5.5 lb/ft.$^3$ |
| 13. (1.5 LiF) $(LiMg_2LiSi_4O_{10}F_2)$ | 1 hr - 900° C. | Fine | 5.7 lb/ft.$^3$ |
|  | 4 hr - 900° C. | Fine | 5.7 lb/ft.$^3$ |
| 14. (2LiF) $(LiMg_2LiSi_4O_{10}F_2)$ | 1 hr - 800° C. | Medium | 5.0 lb/ft.$^3$ |
| 15. (4LiF) $(LiMg_2LiSi_4O_{10}F_2)$ | 1 hr - 900° C. | Very Coarse (cracked) | — |
|  | 4 hr - 900° C. | Very Coarse (cracked) | — |

EXAMPLE 14

A further sample of gel was prepared using the lithium fluorhectorite described earlier. This gel was placed in a high shear mixer and blended with additives as before. The ion exchange glass of Example 1, TABLE 1, was employed in ten gram amount. Prior to blending, however, 200 c.c. (the same volume as the gel) of 35 mesh polystyrene beads were added.

The blended and ion exchanged mass was poured into 3"×3"×2" molds and allowed to set. The foams thus produced were fired at 400° C. to burn out the organic beads. The resulting body had a density of 2.7 lbs./ft$^3$. The thermal conductivity was measured to be 0.3527 BTU in./ft.$^{-2}$hr.$^{-1}$°F.$^{-1}$ at 103° F., and 0.4858 at 305° F.

EXAMPLE 15

The test just described was repeated using the potassium silicate glass of Example 6 as the ion exchange glass and adding 400 c.c. of polystyrene beads, that is, twice the gel volume. When fired at 400° C., this body showed a density of 2.2 lbs./ft$^3$.

It will be apparent that a wide variety of evanescent and/or removable materials may be used in lieu of the organic beads shown here.

The following series of experiments were designed to illustrate the use of powdered glass cements in the preparation of frothed or foamed insulating materials. The composition of the powdered glass corresponded to Example 1 in TABLE I, except as otherwise indicated. Triton X-100, marketed by Rohm and Haas Company, Philadelphia, Penn., was employed as the surfactant, and Darex Pumping Aid (DPA) polyethylene oxide market by W. R. Grace & Company, New York, N.Y., comprised the thickening agent. In general, those materials were added in amounts of about 0.1-2% by weight of the gel solution which, typically, will have a solids content of about 2.5-25% by weight. A Waring-type blender served as the high shear mixer.

EXAMPLE 16

200 grams of a lithium fluorhectorite gel, prepared in accordance with U.S. Pat. No. 4,239,519 above and containing 10% by weight solids, were placed into the blender. After activating the blender, 1 to 2 grams of Triton X-100 surfactant were added to cause a frothing action. To the stirring froth were added 20 grams of the glass powder, the particles thereof passing a No. 200 United States Standard Sieve, followed by 1 gram of DPA. The latter rapidly increased the viscosity of the froth to resist coalescence of the air cells. The froth was poured into a polyethylene mold and permitted to rest therein at ambient or room temperature. The froth set up in about 10-20 minutes. After about 16 hours, the mass was removed from the mold and dried at about 40° C. in a forced draft oven. A linear shrinkage from the original molding of about 10% was observed. The density of the mass was measured at about 11.5 lbs./ft$^3$.

EXAMPLE 17

While blending, 2 to 3 grams of Triton X-100 surfactant were added slowly to 200 grams of the gel described above in Example 16. Thereafter, 20 grams of powdered $Mg(OH)_2$ were added followed by 20 grams of glass powder. Finally, 1 gram of DPA thickener was added which not only thickened the froth but also caused some additional frothing. The froth was poured into a polyethylene mold at room temperature where it set up in about 10-20 minutes. In like fashion to Example 16, the mass was left in the mold for about 16 hours, after which it was extricated therefrom and dried at about 40° C. in a forced draft oven. The body experienced about a 5-10% linear shrinkage and surface cracking was minimal. The density of the product was about 13.3 lbs./ft$^3$.

EXAMPLE 18

A procedure identical to that described above in Example 17 was followed, except that 20 grams of powdered $Ca_2SiO_4$ (wollastonite) were incorporated into the froth instead of $Mg(OH)_2$. The dried foamed body was nearly crack-free and exhibited a density of about 11.2 lbs./ft$^3$.

EXAMPLE 19

While blending, 15 grams of Triton X-100 surfactant were slowly added to 1500 grams of the gel utilized in Example 16. After development of a substantial froth, 150 grams of glass powder were added slowly, while blending, to insure uniform distribution throughout the froth. Subsequently, about 8 grams of DPA thickener were added slowly, while blending, to achieve uniform distribution. When the froth appeared to reach its maximum volume expansion, it was poured into a round polyethylene container, having a diameter of 12", and allowed to set up at room temperature. The froth set up in about 5 minutes. The rate of set can be controlled by the amount of glass powder included therein, and by the time of blending, since blending inherently effects a heating of the froth. After removal from the mold in about 16 hours and drying at 40° C. in a forced air oven, the body was measured to have a diameter of about 10.5" and a thickness of about 1.25". No cracks were observed in the body and the density thereof was 15.6 lbs/ft$^3$.

EXAMPLE 20

While blending, 2.5 grams of Triton X-100 surfactant were added to 200 grams of the gel employed in Example 16. Thereafter, 20 grams of powdered wollastonite and 10 grams of powdered glass were added in that sequence while blending. Then, 1.5 grams of DPA thickener were incorporated, and blending was continued until it appeared that the maximum volume expansion had been reached. The froth was subsequently poured into a polyethylene mold and permitted to set up at ambient temperature. After removal from the mold and drying at about 40° C. in a forced air oven, an essentially crack-free body having a density of about 9.9 lbs./ft$^3$ was in hand.

EXAMPLE 21

A procedure identical to that described above in Example 20 was followed, except that the gel utilized, while of the same composition, had a solids content of only 5%. A coherent, essentially crack-free body was obtained having a density of about 6 lbs./ft$^3$.

EXAMPLE 22

While blending, 2.5 grams of Triton X-100 surfactant were added to 200 grams of a gel which, while having the same composition as that described in Example 16, had a solids content of only 2.5%. As the blending continued, 20 grams of powdered wollastonite were added to the froth followed by 8 grams of glass powder. Finally, 1.5 grams of DPA thickener were added slowly to attain maximum frothing and maximum froth viscosity. The froth was then poured into a polyethylene mold and allowed to set up at ambient temperature. The mold was moved to a forced air oven operating at about 40° C. and the body partially dried for about 5–10 hours while in the mold. Thereafter, the body was extracted from the mold and the drying completed in the oven (about 16 hours). The final body displayed greater shrinkage (about 20%) than those produced in Examples 20 and 21, and did not set as rapidly. However, these deficiencies can be overcome by increasing the quantity of glass powder with or without increasing the wollastonite content also. The density of the body was measured at about 6 lbs./ft$^3$ and the body was essentially crack-free despite the high shrinkage.

EXAMPLE 23

200 c.c. of a lithium fluorhectorite gel, prepared in accordance with Example 16, were placed in a high shear blender. While blending, 2 grams of Triton X-100 surfactant and 1.5 grams of DPA thickener were added. These additions caused expansion of the frothed dispersion to twice its original volume. The frothed gel was poured into a mold, and a 2 molar KCl solution was lightly misted over the surface of the froth, initiating K$^+$ for Li$^+$ exchange and setting up a tough outer surface or skin. Additional KCl solution is added slowly to cover the froth. Total exchange throughout the depth of the body takes place by diffusion of the K$^+$ ion into the frothed body with timing dependent upon the thickness. The foam body can be floated out of the mold and then dried. The resulting body exhibited a density of 9 lb./ft.$^3$.

EXAMPLE 24

200 c.c. of a cold (~1° C.) lithium fluorhectorite gel, prepared in accordance with Example 16, but containing 8% solids, were placed in a high shear blender. While blending, 2 grams of Triton X-100 surfactant, 6 grams of a 12.5% solution of a quaternary ammonium acid salt, 9 grams of the ion exchange glass of Example 6, TABLE I, and 1.5 grams of the DPA thickener were added in that order. Blending was continued until a maximum expansion of the frothed gel, somewhat greater than twice the original volume, was achieved. The frothed gel was then poured into a mold to set up at ambient temperature (through continued ion exchange of the organic polycation and the potassium ion for lithium ion). After several hours, the solidified froth was removed and further dried. The body was then heated to about 120° C. for one hour to cause cross linkage of the organic ion, thereby improving green strength of the body and ultimate resistance to strength degradation at high humidity. The body had a density of 3 lb./ft$^3$.

The quaternary ammonium acid salt is a cationic, water-soluble condensate of a basic polyamide and epichlorohydrin which has assumed a polyamide-polyamine-epichlorohydrin resin form. It could be used alone for ion exchange, but diminishes flame and heat resistance properties due to its organic nature. Therefore, a mix of organic and inorganic ion exchangers is generally preferred.

EXAMPLE 25

The procedure and materials of Example 24 were repeated, except that one gram of polyethylene imine was added as an organic cationic exchanger instead of the quaternary ammonium acid salt of that example. The resulting dry foamed body had a density of 4 lb./ft$^3$.

EXAMPLE 26

200 c.c. (50 grams) of fine vermiculite were blended with 200 c.c. of a 6% solids, lithium fluorhectorite gel. 2 grams of Triton X-100 surfactant, 6 grams of the ion exchange glass of Example 6, TABLE I, and 1.5 grams DPA thickener were added in that order. After frothing to the maximum volume, the frothed gel was poured into a plastic mold and allowed to set until ion exchange was complete. The body was dried and found to be tough and crack-free. It had a density of 8.1 lb./ft$^3$.

EXAMPLE 27

200 c.c. of a 6% solids content, lithium fluorhectorite gel was vigorously blended with successive additions of 0.25 grams of a fluorsurfactant sold by DuPont under the trademark ZONYL, 7.5 grams of the hydraulic cement glass of Example 1, TABLE I, and 1.5 grams DPA thickener. When the frothed gel reached maximum volume, it was allowed to set up, via potassium for lithium ion exchange, in a plastic mold. After drying at 100° C., the body had a density of 6 lbs./ft$^3$.

EXAMPLE 28

200 c.c. of a 6% solids content, lithium fluorhectorite gel were blended with successive additions of 2 grams Triton X-100 surfactant, 1.2 grams of a polyaramide fiber available from DuPont under the trademark KEV- LAR, 6 grams of the hydraulic cement glass of Example 6, TABLE I, and 1.5 grams of DPA thickener. The fully expanded froth was set up in a mold and then dried. The dried body had a density of 3.2 lbs./ft$^3$.

EXAMPLE 29

The procedure and materials of Example 28 were repeated, except that 2.4 grams of chopped glass fibers (~⅛" length) were added instead of the polyaramide fibers of that example. The dried body had a density of 2.7 lb./ft$^3$.

EXAMPLE 30

200 c.c. of an 8% solids content, lithium fluorhectorite gel was blended with successive additions of 2 grams Triton X-100 surfactant, 4 grams of an inorganic thickener, 9 grams of the hydraulic cement glass of Example 6, TABLE I, and 0.8 grams DPA thickener. The inorganic thickener was a lithium fluorhectorite prepared by an autoclaving procedure. It is characterized by a finely divided powder form, rather than the platelet nature of the water-swelling micas employed as gel-forming materials. The frothed body was molded, dried, and found to have a density of 6.9 lbs./ft$^3$.

EXAMPLE 31

A gel prepared from a lithium fluorhectorite glass-ceramic was released into a potassium chloride solution to exchange potassium ions (K$^+$) for lithium ions (Li$^+$) and to flocculate the potassium-ion-exchanged crystals. The flocculated gel was thoroughly washed and the drained floc retained. The wet floc amounted to 30 grams, equivalent to 7.5 grams dry weight.

200 c.c. of a 10% solids content, lithium fluorhectorite gel wire then blended with successive additions of the potassium-ion-exchanged floc, 2 grams Triton X-100 surfactant, nine (9) grams of the hydraulic cement glass of Example 6, TABLE I, and 1.5 grams DPA thickener. When the mix was fully frothed, it was poured into a plastic container where it set up as the ion exchange progressed to completion.

The dried, foamed body was observed to be crack-free, to have good strength, and to have a density of 4.5 lbs./ft$^3$.

EXAMPLE 32

200 c.c. of a 6% solids content, lithium fluorhectorite gel were blended with 2 grams Triton X-100 surfactant, 1.5 grams DPA thickener, 3 grams Cu(NH$_3$)$_4$SO$_4$ powder and 10 grams formamide. The latter hydrolyzes in basic solution to yield excess NH$_4$ in case there is some Cu(OH)$_2$ in the complex salt. After frothing the mixture in a blender, the foam is allowed to set up in a plastic container and then is allowed to dry. Upon drying at about 100° C., the coarse cellular foam was found to have a density of about 9.2 lb./ft$^3$. Subsequent soaking of the blue foam body in water gave no evidence of blue coloration in the water phase, and the body retained its integrity and rigidity.

EXAMPLE 33

200 c.c. of a 10% solids content, lithium fluorhectorite gel (adjusted to pH<6.0 with HCl) were blended with 2.0 grams Triton X-100 surfactant, 1.5 grams DPA thickener, and 5.5 grams CuSO$_4$ crystals. The blended froth set up rapidly after being placed in a plastic box. On drying the coherent foam body had a density of 4.0 lb./ft$^3$.

EXAMPLE 34

200 c.c. of 10% solids content, lithium fluorhectorite gel (adjusted to pH<6) were blended with 1.5 gram DPA thickener, 2.0 gram Triton X-100 surfactant and 6 grams barium acetate powder. The frothed mixture was poured into a plastic box to set up by the exchange reaction Ba$^{++}$ for Li$^+$. It was then dried to form a relatively strong coherent foam body with density of 4.1 lb./ft$^3$.

EXAMPLE 35

The procedure of Example 34 was followed, but 4 grams barium acetate and 4 grams of the quaternary ammonium acid salt of Example 24 (12.5% solution) were used as large cation donors. The resultant foam was coherent and possessed a density of 5.1 lb./ft$^3$.

Numerous specific examples have been set forth to illustrate the invention. The invention should not, however, be considered to be limited thereby. In particular, the invention has been largely illustrated with reference to potassium ion donors and particularly potassium silicate glasses as such ion donors. While such are currently considered preferred embodiments, it should be appreciated that other large cations, as disclosed in the cited art, may be substituted if desired.

We claim:

1. A cellular ceramic body of high mechanical strength and exhibiting a density of less than 15 lbs./ft$^3$ consisting essentially of the ion exchange product of a large cation donor and a synthetic, lithium and/or sodium, water-swelling mica wherein the lithium and/or sodium ions on the mica surface are essentially replaced by the large cations, and the mica being selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite.

2. A cellular ceramic body according to claim 1 wherein the large cation is potassium and the donor is a potassium salt or glass powder.

3. A cellular ceramic body according to claim 2 wherein the potassium ion donor is a potassium silicate glass powder and wherein, exclusive of other additives, the ion exchanged glass powder will constitute 25–60% and the ion exchanged mica will constitute 75–40% by weight of the cellular ceramic body.

4. A cellular ceramic body according to claim 3 wherein the potassium silicate glass is a hydraulic cement consisting essentially of potassia, silica, and at least one metal oxide selected from Al$_2$O$_3$, V$_2$O$_5$, TiO$_2$, MoO$_3$, and WO$_3$.

5. A cellular ceramic body in accordance with claim 3 wherein the potassium silicate glass powder is composed, in terms of mole percent on the oxide basis, essentially of 60–76% SiO$_2$, 15–30% K$_2$O, and 2–15% total of at least one metal oxide selected from the group of 0–10% Al$_2$O$_3$, 0–5% V$_2$O$_5$, 0–5% TiO$_2$, 0–5% MoO$_3$ and 0–5% WO$_3$.

6. A cellular ceramic body in accordance with claim 5 wherein the selected metal oxide is Al$_2$O$_3$ in combination with V$_2$O$_5$ and/or TiO$_2$.

7. A cellular ceramic body in accordance with claim 1 wherein the body contains up to 10% P$_2$O$_5$.

8. A cellular ceramic body in accordance with claim 1 wherein the water-swelling mica is lithium fluorhectorite.

9. A cellular ceramic body according to claim 2 wherein the potassium ion donor is a potassium salt.

10. A cellular ceramic body according to claim 1 also containing up to 80% by weight of fillers or extenders.

11. A cellular ceramic body according to claim 10 wherein said fillers or extenders are selected from inorganic beads and bubbles, wolla-stonite, talc, magnesium oxide, magnesium hydroxide, and vermiculite.

12. A cellular ceramic body according to claim 10 wherein said fillers or extenders also are selected from the group known as thermal opacifiers.

13. A cellular ceramic body according to claim 12 wherein the selected thermal opacifier is titania and/or zirconia.

14. A cellular ceramic body in accordance with claim 1 and having a density less than 6 lbs./ft$^3$.

15. A cellular ceramic body according to claim 2 wherein the potassium ion content in the ion-exchanged mica (calculated as $K_2O$) is at least 5% by weight.

16. A cellular ceramic body according to claim 15 wherein the potassium ion content is in the range of 5–15%.

17. A method for preparing a cellular ceramic body of high mechanical strength and exhibiting a density of less than 15 lbs/ft$^3$ which comprises the steps of:
    (a) forming a crystal-containing gel from a synthetic, lithium and/or sodium, water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, polylithionite, fluorpolylithionite, phlogopite, and fluorphlogopite, said gel containing about 2.5–25% by weight solids;
    (b) subjecting the gel to high shear blending action;
    (c) adding a surfactant in an amount of about 0.1–2% by weight of said gel to cause bubble formation leading to the development of a froth as the gel is sheared;
    (d) while blending, adding a source of an exchangeable large cation as an ion donor to cause an ion exchange reaction to take place between the large cations of said donor and the lithium and/or sodium ions of said lithium and/or sodium, water-swelling mica, thereby producing a frothed gel containing ion-exchanged mica crystals;
    (e) delivering said frothed, ion-exchanged gel from the blender to form a body of desired configuration;
    (f) allowing the ion exchange to proceed to essential completion, thereby thickening and setting the gel to a solid body; and then,
    (g) drying said body.

18. The method of claim 17 wherein the exchangeable large cation is potassium, and the ion donor is a potassium salt or glass powder.

19. The method of claim 18 wherein the potassium ion donor is a potassium silicate glass powder.

20. A method according to claim 19 wherein the glass powder, expressed in terms of mole percent on the oxide basis, consists essentially of about 15–30% $K_2O$, 60–76% $SiO_2$, and 2–15% total of at least one metal oxide selected from the group of 0–10% $Al_2O_3$, 0–5% $V_2O_5$, 0–5% $TiO_2$, 0–5% $MoO_3$ and 0–5% $WO_3$.

21. A method according to claim 20 wherein the selected metal oxide is $Al_2O_3$ in combination with $V_2O_5$ and/or $TiO_2$.

22. A method according to claim 19 wherein, prior to the addition of said glass powder, fillers or extenders are added in an amount sufficient to yield up to 80% by weight of said body.

23. A method according to claim 22 wherein said fillers or extenders are selected from inorganic beads and bubbles, wollastonite, talc, magnesium oxide, magnesium hydroxide and vermiculite.

24. A method according to claim 22 wherein said fillers or extenders are selected from a group known as thermal opacifiers.

25. A method according to claim 24 wherein said thermal opacifiers are titania and/or zirconia.

26. The method of claim 19 wherein the amounts of said gel and said glass powder are such that, exclusive of other additives, said dried body consists essentially, in weight percent, of 75–40% potassium-ion-exchanged, lithium and/or sodium, water-swelling mica and 25–60% glass powder.

27. A method in accordance with claim 17 wherein $P_2O_5$ is present in the frothed, ion exchanged gel in such amount as to provide up to 10% in the cellular ceramic body.

28. A method in accordance with claim 19 wherein the composition of the glass powder includes $P_2O_5$.

29. A method according to claim 17 wherein removable particles are incorporated in the crystal-containing gel, and said particles are removed from the cellular body after drying.

30. A method according to claim 29 wherein the particles are organic in nature and are removed by thermal treatment and/or oxidation.

31. A method according to claim 17 wherein the water-swelling mica is lithium fluorhectorite.

32. A method according to claim 17 wherein the water-swelling mica is prepared by sintering or fusion casting and recrystallizing a raw material batch.

* * * * *